United States Patent [19]
Glynn

[11] Patent Number: 5,552,920
[45] Date of Patent: Sep. 3, 1996

[54] OPTICALLY CROSSLINKED COMMUNICATION SYSTEM (OCCS)

[76] Inventor: Thomas W. Glynn, 1806 Severn Grove Rd., Annapolis, Md. 21401

[21] Appl. No.: 480,743

[22] Filed: Jun. 7, 1995

[51] Int. Cl.$^6$ .......................... H04B 10/00; H04B 7/185
[52] U.S. Cl. .......................... 359/172; 359/117; 359/128; 455/13.3; 342/352
[58] Field of Search .......................... 359/172, 117, 359/128, 157; 455/109, 12.1, 13.3, 25; 342/352, 354, 359

[56] References Cited

U.S. PATENT DOCUMENTS

| | | | |
|---|---|---|---|
| 4,931,802 | 6/1990 | Assal et al. | 455/13.3 |
| 5,119,225 | 6/1992 | Grant et al. | 359/172 |
| 5,428,814 | 6/1995 | Mort et al. | 455/13.3 |

*Primary Examiner*—Leo Boudreau
*Assistant Examiner*—Kinfe-Michael Negash
*Attorney, Agent, or Firm*—Venable, Baetjer, Howard & Civiletti, LLP

[57] ABSTRACT

An optically-based communication system hosted on an elevated platform (e.g., a satellite a tower, or other platform having a substantial vantage point) that uses multiple spatially diverse transmit and receive beams that are optically cross coupled to fully reuse the spectrum and which will create a fully interactive, high bandwidth, high capacity, fully switched communication system. The elevated platform (i.e., satellite, orbiting or tethered vehicles, airborne platforms, towers, etc.) reuses its assigned bandwidth in each of (N) multiple beams (or sectors). The beams are formed by either RF or optical means. The specific users in each beam are then spatially separated in frequency by use of an optical "Bragg Cell." The separated signals are then duplicated through a half mirror and a full mirror and recombined optically to create outputs that are unique combinations of frequencies from each full set of input beams. The recombined signals are then shifted to the transmit band and retransmitted through the same (N) multiple beams. The entire communication system then becomes a single elevated platform which can fully switch a high bandwidth, high channel capacity network.

38 Claims, 11 Drawing Sheets

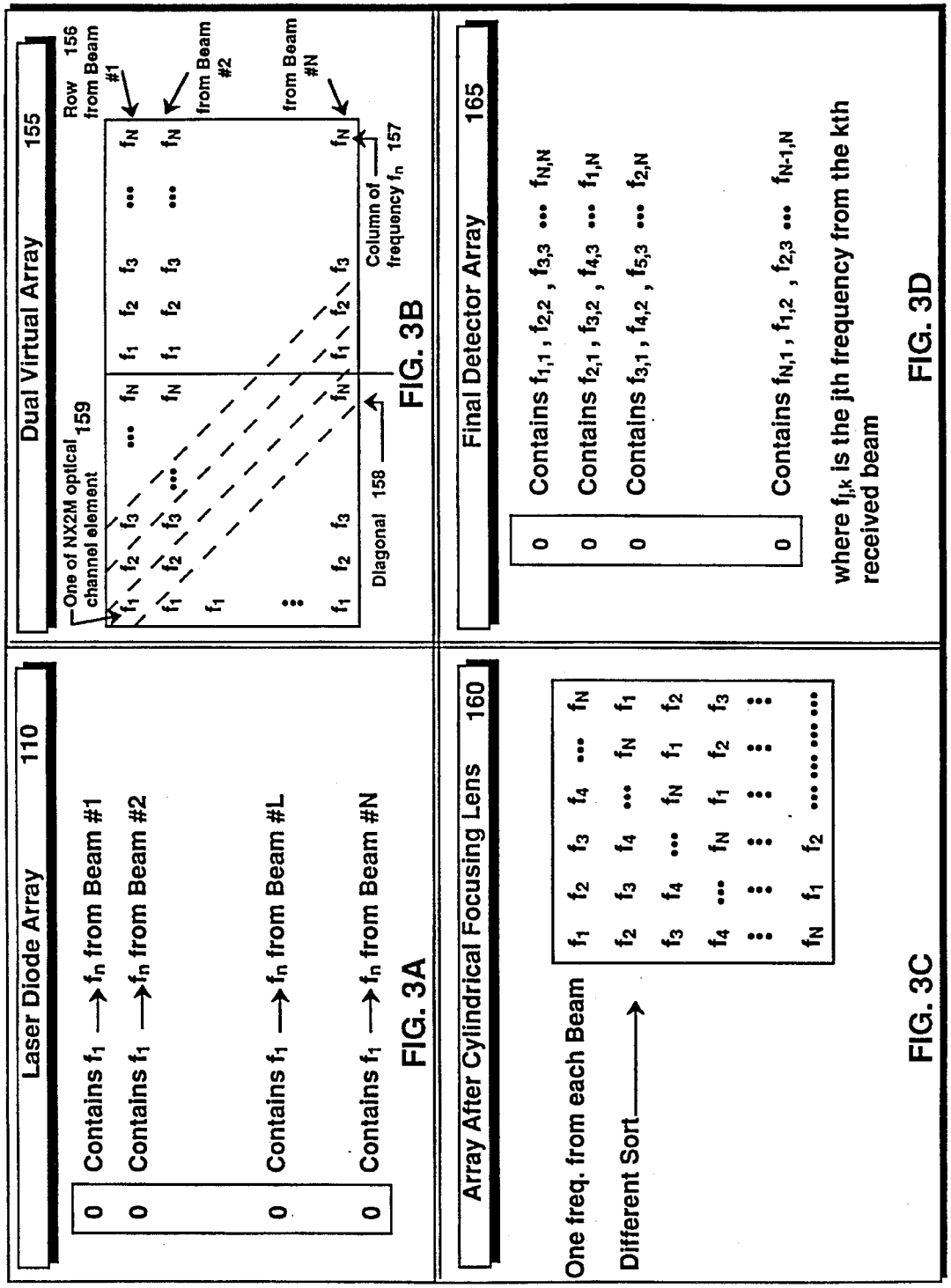

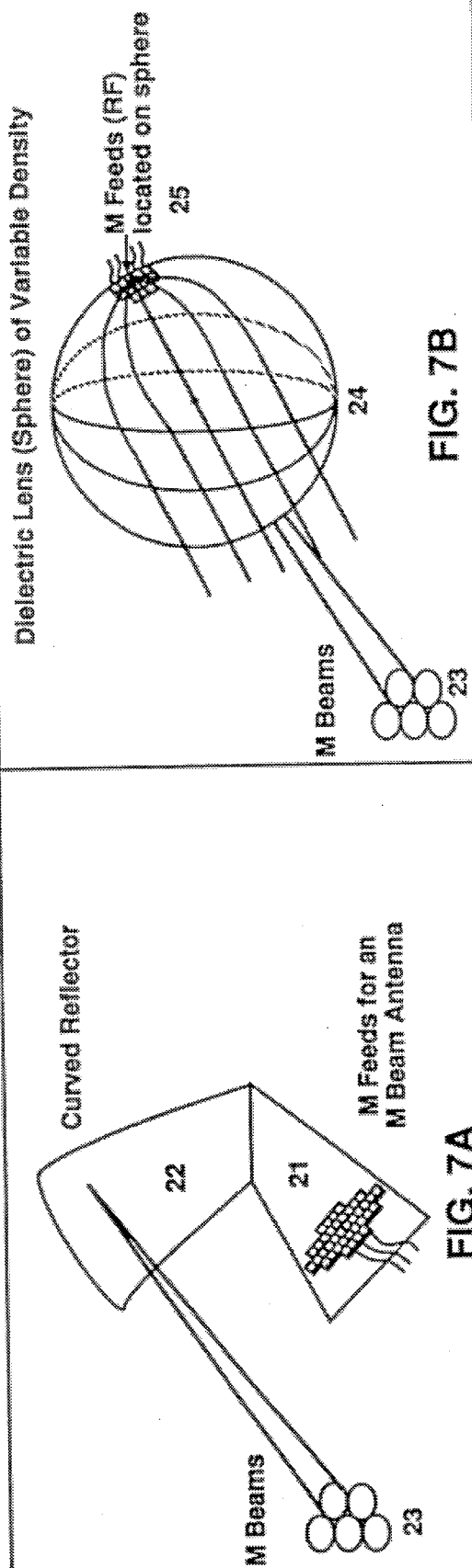
FIG. 7B
FIG. 7A
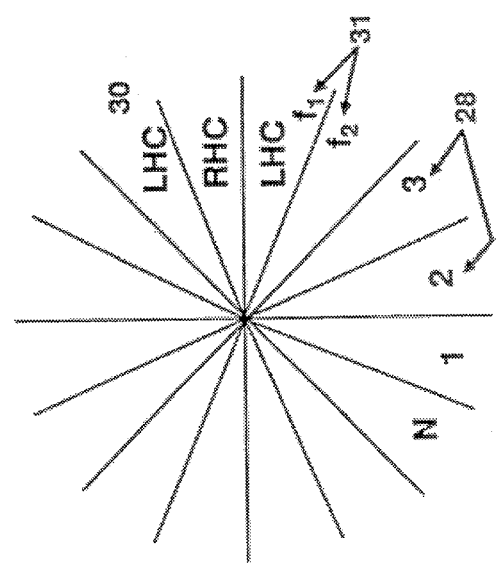
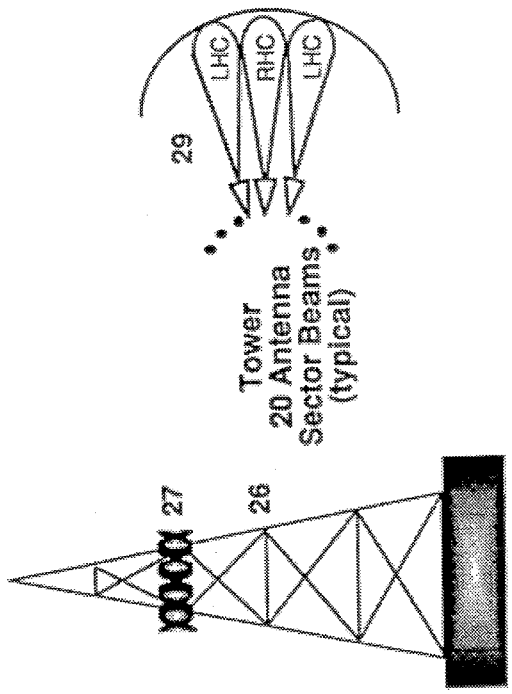
FIG. 7C

OPTICALLY CROSSLINKED COMMUNICATION SYSTEM (OCCS)

BACKGROUND OF THE INVENTION

1. Field of the Invention

The present invention relates to communication systems using elevated platforms (e.g., satellites, orbiting or tethered vehicles, airborne platforms, towers, etc.) for, among other things, a switched relay, and in particular, to the provision of a variable bandwidth, high channel capacity, fully switched, fully interactive communication network operating from a single elevated platform. The inventive system is an optically cross-linked communication system (OCCS).

2. Description of the Related Art

Elevated platforms have been used for radio frequency (RF) communication for years. For example, Cellular telephone systems, Basic Exchange Telephone Radio System (BETRS), Personal Communication Systems (PCS), Geostationary and Low Earth Orbiting (LEO) Satellites, Broadcast Radio and Television (TV) are ubiquitous in our society. In contrast, wide bandwidth systems (typically 1 MHz) have been generally limited to distributive systems (i.e., TV, Direct Broadcast Systems, including DSS, C and Ku band satellite TV systems) or limited to wide bandwidth point-to-point interactive links between a very few (typically 2) points, thereby limiting access to a selected few users.

A typical example is a wide bandwidth point-to-point gateway system, in which a user in Europe communicates to a user in the United States (U.S.) via a satellite positioned over the Atlantic Ocean. The footprint from one of the satellite's beams covers the European user and the footprint from a second beam covers the US user. These wide bandwidth applications exist but are limited presently to a few communication channels.

Some newer "wireless" system designs (e.g., LEO systems such as Iridium, Teledesic, and Globalstar) promise full worldwide interactivity, but they only assure voice capability and other narrowband features, while costing billions of dollars to implement. Typical communication systems have been limited by low bandwidth (typically 10 KHz, sufficient to support 4.8 kilobits/second—kb/sec to 64 kb/sec) because only low bandwidth systems can be fully switched to serve a large number of customers in a fully interactive way. An interesting example of a competing communication system is the U.S. phone system—a "wired" system. It services 130 million lines with fully interactive (switched) 64 kb/sec (about 10 KHz or less of bandwidth) channels. This takes over 20,000 buildings to implement the switching component of the system, and over $200 billion in additional costs for wires, poles, buildings, etc. to implement the "wired" components of the system.

It would be desirable to provide a communication system (or other systems servicing a number of users) that would operate from a single elevated platform that could handle a very large number of customers providing each with fully interactive, switched variable bandwidth (wide or narrow, depending upon user demands) service. Implementing such a system would require a low-cost, low-weight, high performance switch capable of handling digital or analog waveforms, and a variety of multiple access schemes. The application of acousto-optic devices, such as "Bragg Cells," and unique optical switching to provide wide bandwidth, high capacity communication systems from a single elevated platform has not been identified, as far as the present inventor is aware.

SUMMARY OF THE INVENTION

It is an object of the present invention to create a low-cost, low-weight, high performance switch capable of handling digital or analog waveforms, and a variety of multiple access schemes, as an integral component of a communication system hosted on an elevated platform, which does not suffer from the above described drawbacks.

It is a specific object of the invention to provide a system which combines large numbers of antenna beams (e.g., 10 to 4,000), each covering a distinct geographic sector, and a novel optical processing and switching system utilizing Bragg Cell technology. (The terms "beam" and "sector" serve the same purpose for the present invention: both refer to geographically distinct service areas covered by the radiation pattern of one or more antennas). By focusing optical channels, derived from the diverse beams, on an optically coupled Bragg Cell, the frequency content of the optical channels can be spatially separated into a plurality of individual frequency bands. By appropriately splitting (i.e., duplicating or reproducing) the spatially separated optical channels to create a duplicate set of spatially separated optical channels and recombining the two spatially separated sets of optical channels along diagonals, each incoming beam that enters the switch system can access each outgoing beam that exits the switch system by initially selecting the proper up-link frequency. (The up-link frequency is merely the transmit frequency of the source terminal that is attempting to establish communications with a destination terminal via the switch system). This could, for example, allow for simultaneous full switching of one million 1 MHz (i.e., wideband, full motion compressed video) signals to a large number of users; thus yielding, from one satellite, a fully interactive video network capable of supporting the same customer base as the total U.S. telephone system.

A further object of the preferred embodiment of the present invention is to provide a switch capable of handling wide channel bandwidths. The bandwidth achieved by this invention will allow for 100 times the bandwidth assigned to each user of the expensive LEO systems, and handles over 100 times the number of simultaneous users in one elevated platform that the LEO systems handle with as many as 66 to 840 satellites.

A further object of the of the preferred embodiment present invention is to provide a low-cost, low-weight switch system as an integral part of a wireless communications system. Since the inventive system requires only one elevated platform, the cost of the inventive system is relatively quite low to comparable systems such as LEO satellites that require 10's of satellites, or cellular telephone networks that require 1000's of communications towers. The primary internal components of the present invention includes a 1×N Laser diode array, a 1×N detector array, one quartz "Bragg Cell" and a selected few lenses and mirrors. This enables a reduction in system weight to only a few pounds for the basic switching mechanism, thereby making the switching component applicable for use in a variety of elevated platforms, including satellites, orbiting or tethered vehicles, airborne platforms, towers, etc.

A further object of the preferred embodiment of the present invention is to accommodate a large number of antenna beams, each of which service users in distinct geographic sectors, where each beam services a number of users. The OCCS accommodates, for example, from 10 to 4,000 simultaneous beams (the baseline design being 1,000 from a geostationary satellite, for coverage of an area the size of the U.S.). Since coverage (i.e., the footprint) of each beam does not appreciably overlap, it is possible to reuse the full spectrum in each beam if the beams are isolated properly (including, but not limited to, polarization isolation and spatial isolation). It is possible to handle 1000 customers per beam (1 MHz/channel in a total bandwidth of 1000 MHz) enabling total simultaneous usage by approximately 1 million customers. The total number of customers per beam being limited by the multiple access scheme and bandwidth requirements of each user. While the present invention is compatible with a wide variety of multiple access and bandwidth allocation schemes, this invention neither limits, nor requires, nor is improved by the use of any one particular waveform protocol.

It is a further object of the preferred embodiment of the present invention to switch, for example, the 1 million incoming channels to the 1 million outgoing channels. As mentioned above, the present phone system requires over 20,000 buildings to switch the same number of much lower bandwidth audio channels. Moreover, the present invention switches the same number of higher bandwidths (e.g., 1 MHz) video channels within a fairly small elevated platform (e.g., a satellite).

It is a further object of the preferred embodiment of the present invention to use components that are commonly available. The devices necessary to perform the switching function in the present invention (i.e., a 1×N Laser diode array, 1×N detector array, Bragg Cell, and various focusing lenses and mirrors) are all commonly available.

In accordance with the preferred embodiment of the present invention, each customers' ground based unit selects a frequency that corresponds with a frequency assigned to the party to whom he or she wishes to communicate (i,e,, frequency select or encode). The ground based terminal will then transmit a signal to that party at the selected frequency. The antenna on the elevated platform that services this user will receive the transmitted signal within its beam, as well as all the other simultaneous users who are communicating through the same antenna beam. On the elevated platform, each beam, which contains all the frequencies, is used to modulate a Laser diode, which then irradiates a "Bragg Cell," an actively driven acousto-optical material, like quartz. An optical signal will either reflect off of, or pass through the acousto-optical material and will be refracted at different angles for different frequencies. Moreover, frequency bands within each optical channel will be spatially spread, depending upon their modulation frequency. Each spatially spread, discrete frequency band creates an optical channel element. Energy received from each of the other beams are likewise converted to optical channels and simultaneously focused on a separate portion of the Bragg cell, whereby each optical channel is converted into a set of discrete optical channel elements.

The Bragg Cell effectively resolves the wideband optical channels into multiple optical channels having separate frequencies. After collimation by a lens and beam splitting to create two substantially identical sets of optical channel elements, the optical channel elements are collapsed along a 45 degree diagonal to a line array (1×N) of detector diodes such that each detector diode combines a series of unique frequencies from each input beam. Thus, by selecting the appropriate uplink frequency, the output channel is automatically accessed and communications is achieved. The return path follows the same steps to achieve two-way communication.

Special optical or electrical paths can be added to redirect a larger portion of an incoming beams' frequencies back to the same outgoing beam since local calls will probably be more likely than calls to any other beam area. These intra-beam paths essentially by-pass the switch components, and are routed directly to the output of the switch for later transmission to the intended geographic sector.

It is also within the contemplation of the invention to add special circuitry as necessary to break some or all channels down further into over 100 audio channels, or to combine a number of channels (e.g., 6) for high definition television (HDTV) transmission. Moreover, the switch components may be complemented as necessary with additional circuitry to meet specific demands of the communities serviced by the present invention.

BRIEF DESCRIPTION OF THE DRAWINGS

FIGS. 3A, 3B, 3C, and 3D describe the approach used for frequency sorting and cyclical recombining for each channel per beam.

FIGS. 7A, 7B, and 7C are several variants for creating a multiple beam antenna design in accordance with the invention.

DETAILED DESCRIPTION OF THE PREFERRED EMBODIMENTS

Figure 1A:
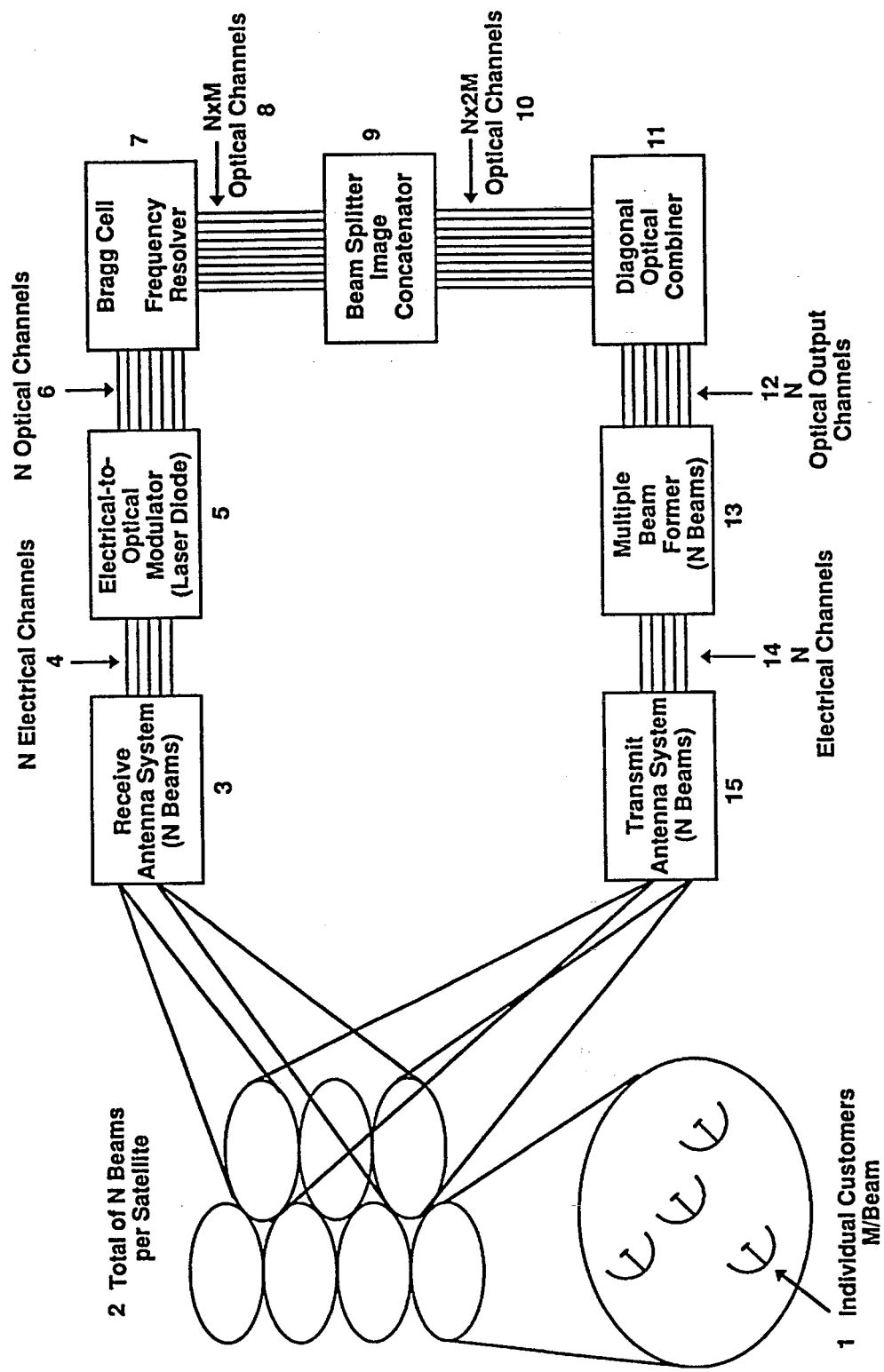
FIG. 1A is an overview of the preferred embodiment of the invention used as an optically coupled communication system (OCCS) for use with a single satellite.

FIG. 1A depicts an OCCS utilizing a satellite as the host elevated platform (e.g., geostationary, medium earth orbit, or LEO) in accordance with the present invention, in which N beams 2 with simultaneous M customers 1 per beam, are shown. It should be clear that the present invention may similarly be hosted on other elevated platforms including tethered platforms, airborne platforms, towers, etc. These M customers would be only a small fraction of the total potential users in each of the N beams 2. However, since only approximately 1% of the customers use a two-way communication system at one time (average in the U.S.), these M simultaneous users could represent as many as 100×M potential customers or terminals for interactive video, each having a small antenna, a transceiver, a video camera and a video display. Furthermore, depending upon whether a multiple access waveform is used in concert with the invention disclosed herein, the capacity for simultaneous users would increase in proportion to the efficiency of the multiple access scheme. For example, the M customers described herein could in fact support 100 million simultaneous users, where each of the 1000 beams supports 1000 users employing a multiple access waveform having a capacity of 100 users per frequency routed subband; although the present invention does not depend on any particular multiple access scheme. However, it would be clear to one of ordinary skill in the art that the invention disclosed herein would be complementary to many other facets of a larger communications system, including, for example, a new multiple access scheme or a commercial application of waveforms having large time-bandwidth products.

The M simultaneous customers (where M is from 20 to 4,000—typically 1000) would use some near loss-less video compression to compress each signal to a 1 MHz bandwidth (or digital equivalent), for a total of 1000 signals in a typical implementation. These 1000 signals, each having a bandwidth of 1 MHz, are assigned a specific code (i.e., frequency coded) to discriminate one from the next. The total bandwidth of the beam occupies between 0.5 GHz and 1 GHz, depending upon waveform specific parameters such as modulation, error detection and correction coding, waveform protocol, and multiple access scheme. A source terminal establishes communications with a destination terminal by transmitting a signal within one of the N parallel receive beams (typically N=1000) created by the multiple beam receive antenna system 3 on a geostationary satellite (not shown). The OCCS will then route the signal to the destination terminal according to the description herein. Once communications is established between the source terminal and the destination terminal, a two-way communications may occur by completing a similar reverse path.

On the satellite, the 1000 beams received by receive antenna system 3, each containing 1000 simultaneous full bandwidth users are transmitted along N electrical channels 4. These channels are appropriately down converted by receive antenna system 3, if necessary, to support the electrical-to-optical modulator 5. An example of which is a 1×N array of Laser diodes (e.g., typical fiber optic drivers), but any light modulation device array could be used, which then forms N optical channels 6, one per receive beam.

The N optical channels 6, each carrying signals from M users 1 are passed to a frequency resolver 7. The frequency resolver 7 separates each of the signals from the M users 1 in each of the N optical channels 6 to create N×M optical channels 8. The N×M optical channels 8 connect to a Beam Splitter Image Concatenator 9 that duplicates the N×M channels to create N×2M optical channels 10 (i.e., optical channel elements), each of which may be viewed as an optical channel element. Selected ones of the N×2M optical channels 10 (i.e., selected optical channel elements) are cyclically recombined (reoriented and grouped) in a Diagonal Optical Combiner 11 according to their intended geographic destination. Output optical channels 12 are then converted to N electrical channels (signals) 14 via a multiple beam former 13 (e.g., a diode detector array). N electrical channels (signals) 14 are then, after appropriate frequency shifting and amplification, used to feed a transmit antenna system 15 that comprises N transmit antennas. Clearly, the multiple beam former 13 and the N electrical channels 14 could be included within the transmit antenna system 15. Similarly, the N optical output channels 12, multiple beam former 13 and the N electrical channels 14 could augment the diagonal optical combiner 11.

Figure 1B:
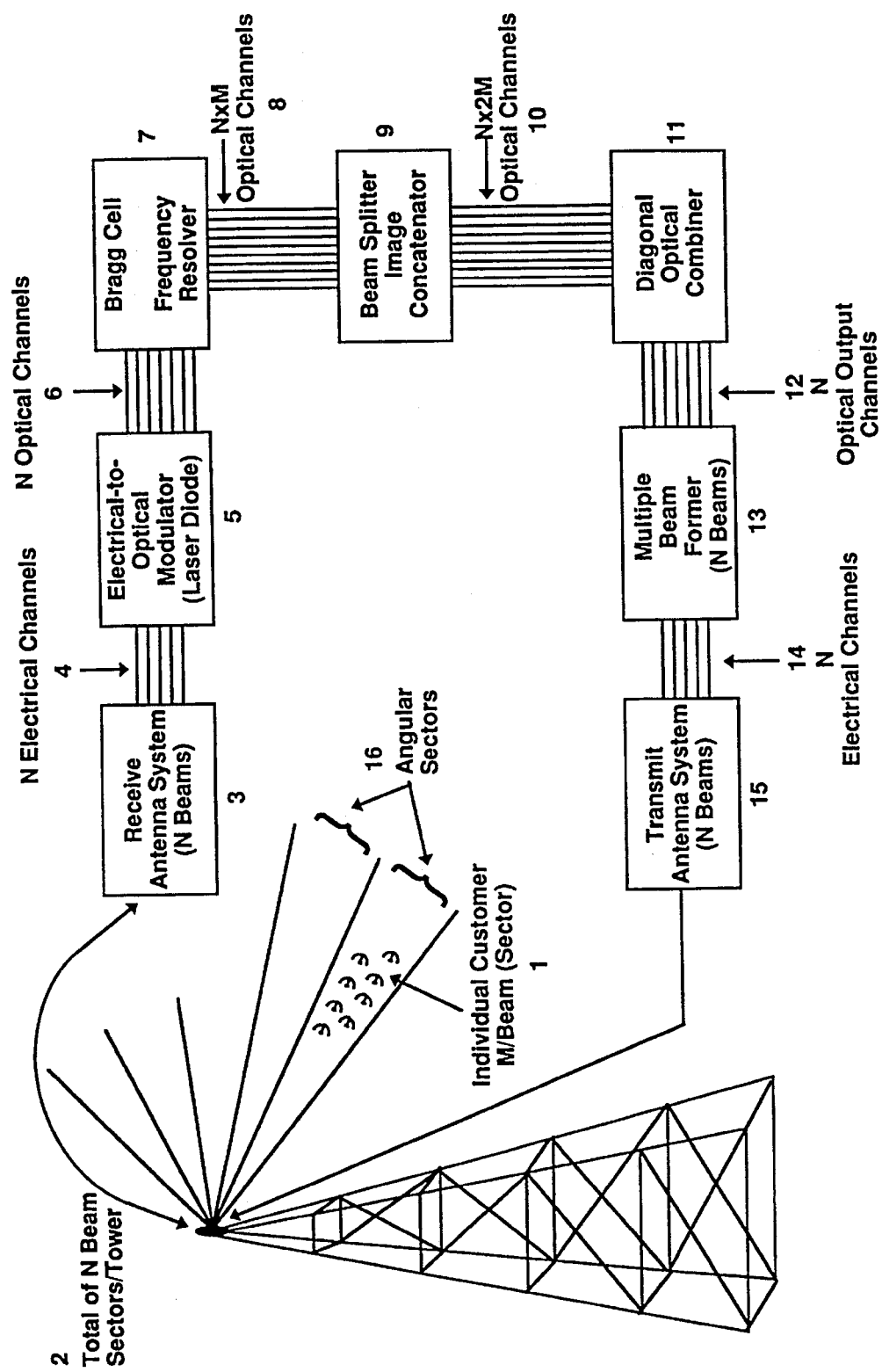
FIG. 1B is an overview of a second embodiment of the invention used as an OCCS for use with a single tower.
Figure 2:
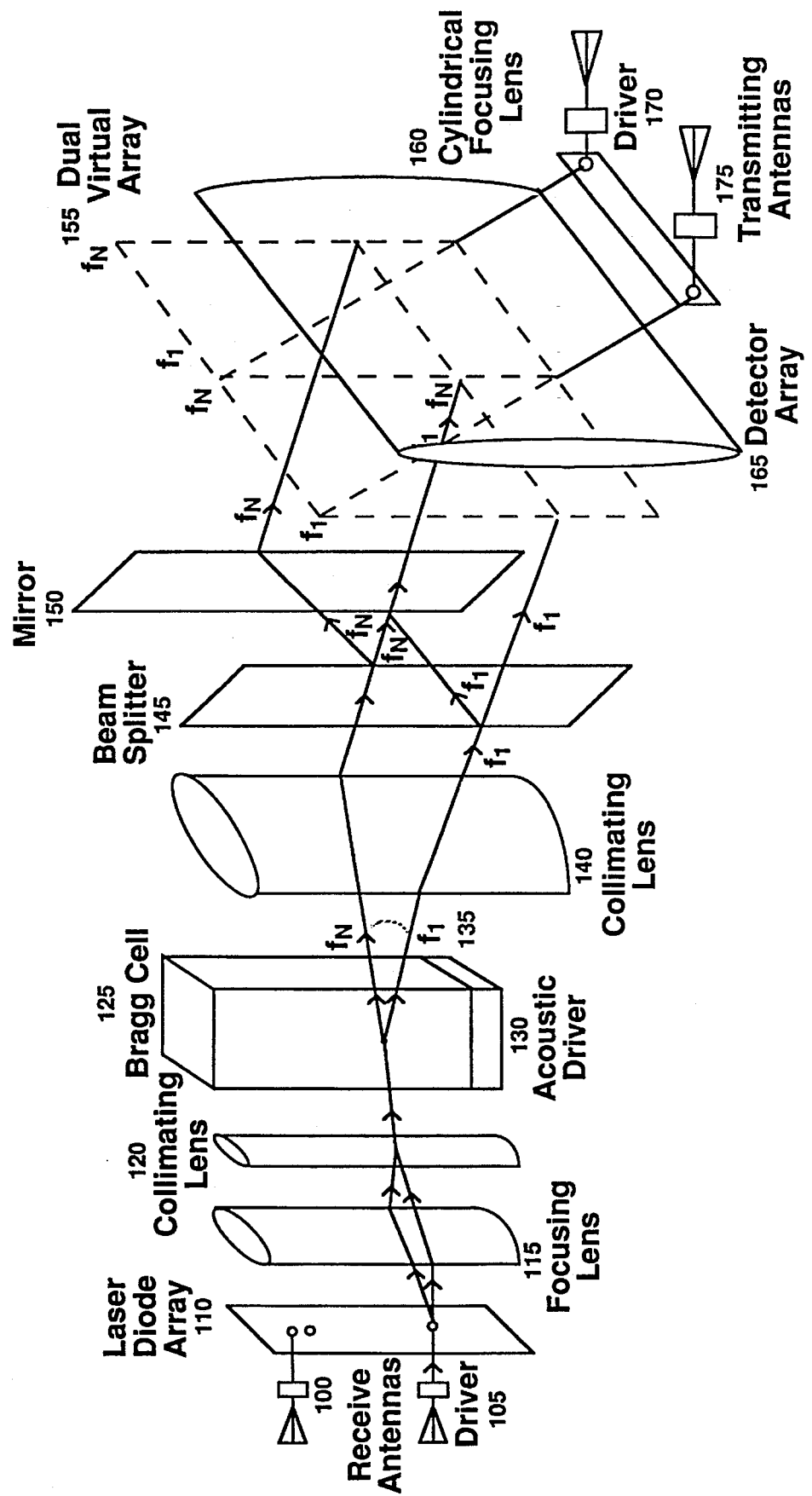
FIG. 2 shows the details of the optical and electrical processing used in the OCCS.

FIG. 1B is an overview of the second preferred embodiment. This is the same system as shown in FIG. 1A, but the elevated platform is a tower, not a satellite. The individual customers M 1 per beam (or sector, the terms are used synonymously herein) are located within specific angular sectors 16. The operation is exactly as described in FIG. 1A. The adjacent sectors must be isolated from each other, either by frequency shift, by polarization (e.g., linear or circular), by code, or by terminal antenna directionality (each isolation approach will later be described in more detail).

The internal processing of OCCS is shown in detail with reference to FIG. 2, FIGS. 3A, 3B, 3C and 3D, and FIGS. 4A, 4B, and 4C. In the preferred embodiment, the receive antennas 100, as part of a receive antenna system, receive frequency coded signals that service M customers 1, approximately 1000 per beam (N beams total), and convert the received electromagnetic energy into N electrical channels 4. These N electrical channels 4, and the M signals resident within each of the channels, are converted to the appropriate frequency by the driver 105 that drives a 1×N Laser diode array 110. N optical channels 6 are output from the 1×N Laser diode array 110, see FIG. 3A, where each of the N optical channels 6 maintains the M signals that were resident within the corresponding N electrical channels 4. FIG. 2 and FIGS. 3A, 3B, 3C, and 3D show the preferred embodiment of M=N. (Other cases where M does not equal N will function adequately and is described in more detail below). Having M=N is preferred since in both cases the inputs and outputs may use the same antennas through a frequency diplexer (frequency diplexers are known in the antenna circuitry art as a means for isolating receive and transmit energy in transceiver applications).

Each of the N optical outputs 6 of array 110 are passed through a cylindrical focusing lens 115 then through a collimating lens 120, and reflected off or passed through a Bragg Cell 125 (an acousto-optic device that is commonly available and known in the art) having an appropriate acoustic driver 130 (positioned on the appropriate surface of the Bragg Cell 125). The Bragg Cell 125 is an acousto-optic device that, when driven, embodies spatially periodic optical index perturbations propagated within the Bragg Cell medium. Each optical channel, having wideband frequency components comprising the M signals, interacts with the perturbations in such a way as to spatially separate the M signals by their frequency content. In turn, each of the N optical channels is converted into M optical channels, spread in one dimension, and all of the N optical channels are converted into N×M optical channels.

The spatial spreading occurs because distinct frequency bands within the optical energy will each interact differently when passed through the Bragg cell 125. Higher frequency optical energy will reflect at a slightly different angle than optical energy having a lower frequency. The Bragg Cell 125 creates secondary optical grating lobes from the wideband light that passes through it. The grating lobes are frequency sensitive in angle: 2nd grating lobes at higher frequencies will propagate at a less acute angle than 2nd grating lobes of lower frequencies. Accordingly, the signals from the M users per beam are spread optically in a plane whose orientation is orthogonal to the direction of propagation of the N channels. Because the signals for each of the M customers was encoded with a different frequency, each of the M signals per optical channel will emerge from the Bragg Cell 125 at slightly different angles 135 and creating a total of N×M optical channels 8.

Once the N×M optical channels 8 have spread sufficiently, they are formed into parallel optical beams by a collimating lens 140. Once collimated, the resulting discrete beams form N×M optical channel elements 159. These optical channel elements 159 are passed-through/reflected-off of a ½ mirror beam splitter 145 and reflected-off a full mirror 150 such as to create two side-by-side virtual arrays—a "dual virtual array." This dual virtual array 155, as shown in FIG. 3B, contains frequencies $f_1$ to $f_N$ and $f_1$ to $f_N$ (remembering that in the preferred embodiment M=N) repeated for each of the original N beams. Thus, the dual virtual array 155 contains a total of N×2M (or N×2N as shown) optical channel elements 159, two substantially identical sets of the N×M optical channels 8 that emerged from the Bragg Cell 125. This dual virtual array 155 is "virtual" in that it only exists in space and need not be focused or imaged on any surface. The N×2M optical channel elements 159 of the dual virtual array 155 are then selectively passed through a cylindrical focusing lens 160. Since the cylindrical focusing lens 160 is oriented at 45 degrees, relative to both the rows 156 and columns 157 of the dual virtual array 155, only optical channel elements 159 within each of the M diagonals 158 of the dual virtual array 155 are combined (i.e., selective focusing). Moreover, the cylindrical focusing lens adds together only those optical channel elements 159 that reside within the same diagonal 158 in the dual virtual array 155. As shown in FIG. 3C, the output of cylindrical focusing lens 160 contains one frequency band (that corresponds to one of the original M users 1 in a specific beam) from each of the original N beams 2. This is the essence of the inventive switch system: $f_1$ from beam 1 is combined with $f_2$ from beam 2, etc., without the need to translate the channels to baseband and without any processing in the switch system. Moreover, the source terminal (i.e., one of the user terminals) and the destination terminal (another user terminal) include all the requisite control elections to properly route signals through the switch system. In effect, the terminals merely need to decide the up-link frequency in order to affectively switch to the proper destination beam/sector. The OCCS optics and electronics hosted on the elevated platform requires no control electronics or control hub electronics to switch signals: the source terminal affects switching by choosing the proper transmit (up-link) frequency. Furthermore, the users determine how they will uniquely address one another: the switch does not play a role in deciphering addresses.

Each of the N outputs 12 of the cylindrical focusing lens 160 are focused on a corresponding detector from a 1×N row of detectors 165. The output of each detector then contains all frequencies from $f_1$ to $f_N$, but each frequency originated from a different input beam as shown in FIG. 3D. Each of the N electrical outputs (14 not shown in FIG. 2) from the N detectors are translated to the appropriate transmit band, amplified by driver 170 and used to drive a corresponding transmit antenna 175 whose beams each service M simultaneous customers.

Thus, any customer serviced within any one beam can contact any other customer in any beam by simply selecting the appropriate transmit (i.e., uplink) frequency. The receiving customer merely monitors the energy within the receiving customer's beam for a frequency band, particular subband, code, preamble or other protocol means that has been uniquely assigned to the receiving customer. Once detected, the two parties may initiate full video interactive communication.

Figure 4A:
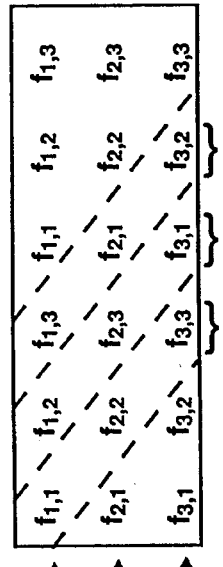
FIGS. 4A, 4B, and 4C show how frequency sorting and cyclical recombining is achieved for the three cases, M=N;M>N; and M<N.
Figure 4B:
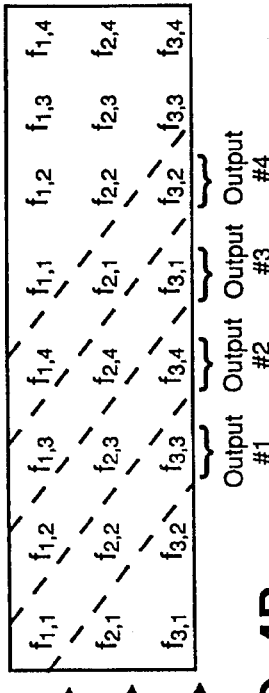
Figure 4C:
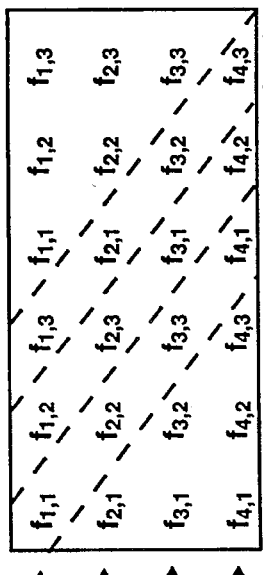

FIGS. 4A, 4B, and 4C show how the internal processing and terminal coding is performed in each of the three possible combinations of sizes of M and N: M=N, FIG. 4A.; M >N, FIG. 4B; and M<N, FIG. 4C. As shown in FIG. 4A, if M=N, then any subband (i,e., any one of the frequency bands comprising the N subbands) in any beam (of N beams) may be linked to any output beam, and thus, enabling a side-by-side N×N-by-N×N switch matrix.

If however, M>N, as shown in FIG. 4B, there are more user M signals per beam, which means there are more subbands M per beam than there are beams, i.e., N beams. In this case the OCCS generates M outputs, as shown. Each output is a combination of three subbands from the three input beams. This, by extension, could be used as a distribution scheme where a smaller number of source channels (say 10,000) could be switched to any of 1 million customers. The case of M>N addresses a major problem in "video dial tone" applications, where the distribution system has a limited ability to distribute entertainment information interactively, yet to multiple destination terminals. On the other hand, additional transmit antennas (i,e., M antennas) are required to support each output.

For those applications where M<N, as shown in FIG. 4C, there are fewer inputs M, subbands per beam, than beams N. Nonetheless the OCCS will generate M outputs, as shown. Each output will have only 3 subbands that are selectable from three of the four input beams. This is akin to a selection process where a small number of outputs are generated from a large potential of inputs.

Figure 5:
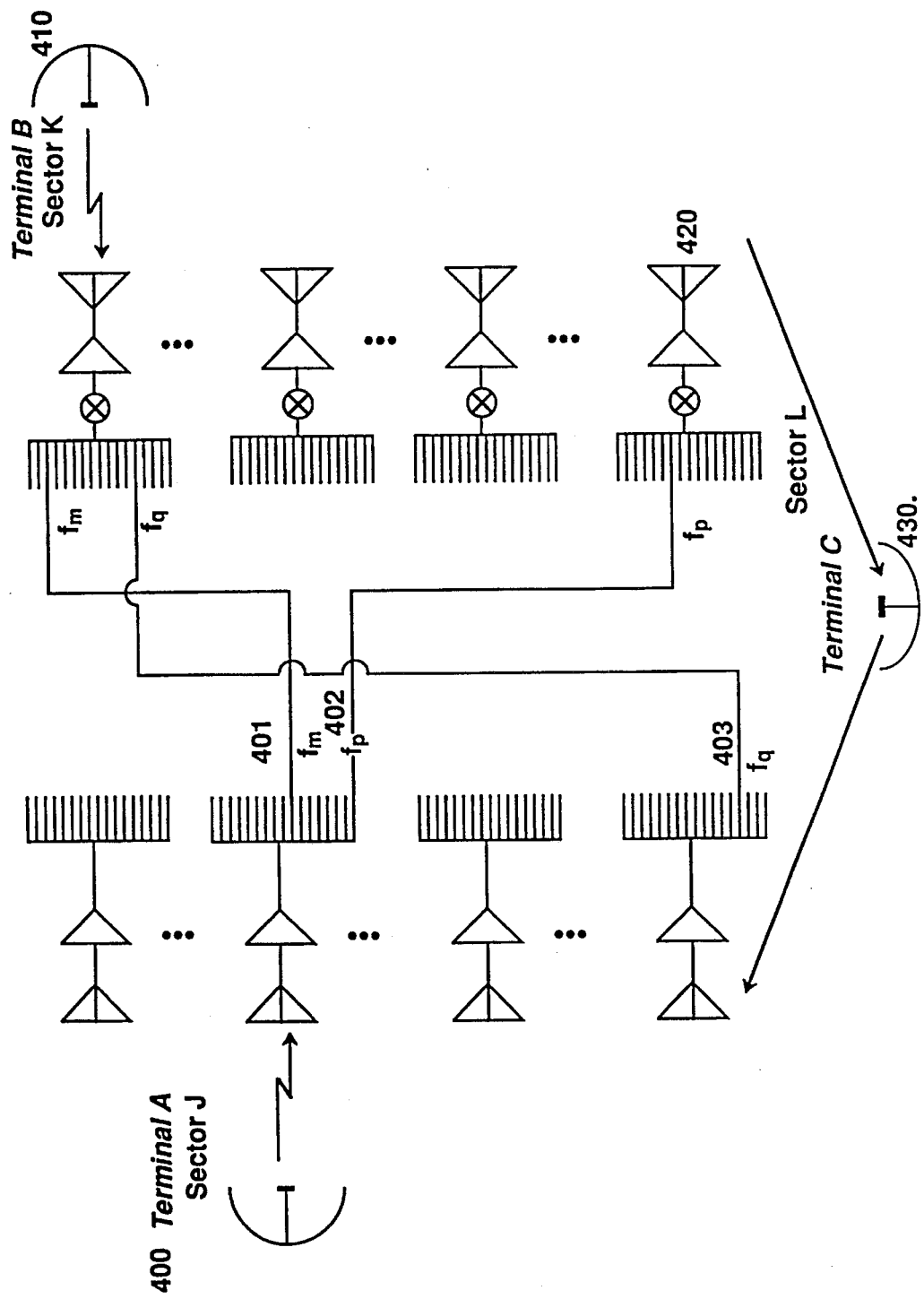
FIG. 5 describes a random switching "double hop" capability added to the first or second embodiment of the invention, or any other embodiment that uses frequency bands to distinguish users from separate geographical sectors.

In a slightly more complex embodiment, a "double hop" capability can be added in which at least one intermediate terminal (i.e., a user terminal is at least capable of transmitting, receiving, and encoding signals that are to be routed through the OCCS) would be used as an intelligent repeater. In reference to FIG. 5, the intermediate terminal would be used when, for example, Terminal A 400 in Sector J (a source terminal) was attempting to establish communications with Terminal B 410, in Sector K (a destination terminal), but the channel 401 within the beam that services Terminal A 400, $f_M$ 401 is occupied; thus, blocking communications between Terminal A 400 and Terminal B 410. In normal operations, Terminal A 400 communicates directly with Terminal B 410 by routing signals through the switch system hosted on the elevated platform. In the case of blocking, Terminal A 400 would detect that the channel 401 is occupied, using Terminal A's channel detection circuitry 450 (e.g., using any of many well known energy detection circuits), and would re-code the signal (e.g., change the up-link frequency using a predetermined encoding scheme) so that the re-coded signal would be rerouting through a channel 402 in a sector (e.g., Sector L 420) that was not fully occupied. The re-coded signal would then be routed through a remote intermediate terminal or transceiver (either ground-based or hosted on an elevated platform), Terminal C 430 located in Sector L. Terminal C 430 then detects the signal to be routed and re-codes, for a second time, the signal destined for Terminal B 410 and transmits the signal in the appropriate channel, $f_q$ 403, to Terminal B 410, via Sector K 20k. Thus, if the link from the Jth beam to the Kth beam were in use, one could go from the Jth beam to a transceiver in the Lth beam and from the Lth beam to the Kth beam—a "double hop." The intermediate terminal may be a ground-based terminal or a terminal hosted on an elevated platform.

This "double hop" capability permits random switching when any one of the channels within a beam are occupied or blocked. It should be expected that those beams servicing heavily populated urban areas will be the most likely to experience blocking. Conversely, beams servicing remote rural regions will be blocked to a much lesser extent, and therefore, would be good candidates for the intermediate terminals needed to support the system's "double hop," random switching capability. Certain other configurations could be used to support "double hopping." For example, this could be done with dedicated transponders dispersed in many lightly loaded beams or one could design all customer units to accommodate this service when that unit is not in normal use.

Figure 6:
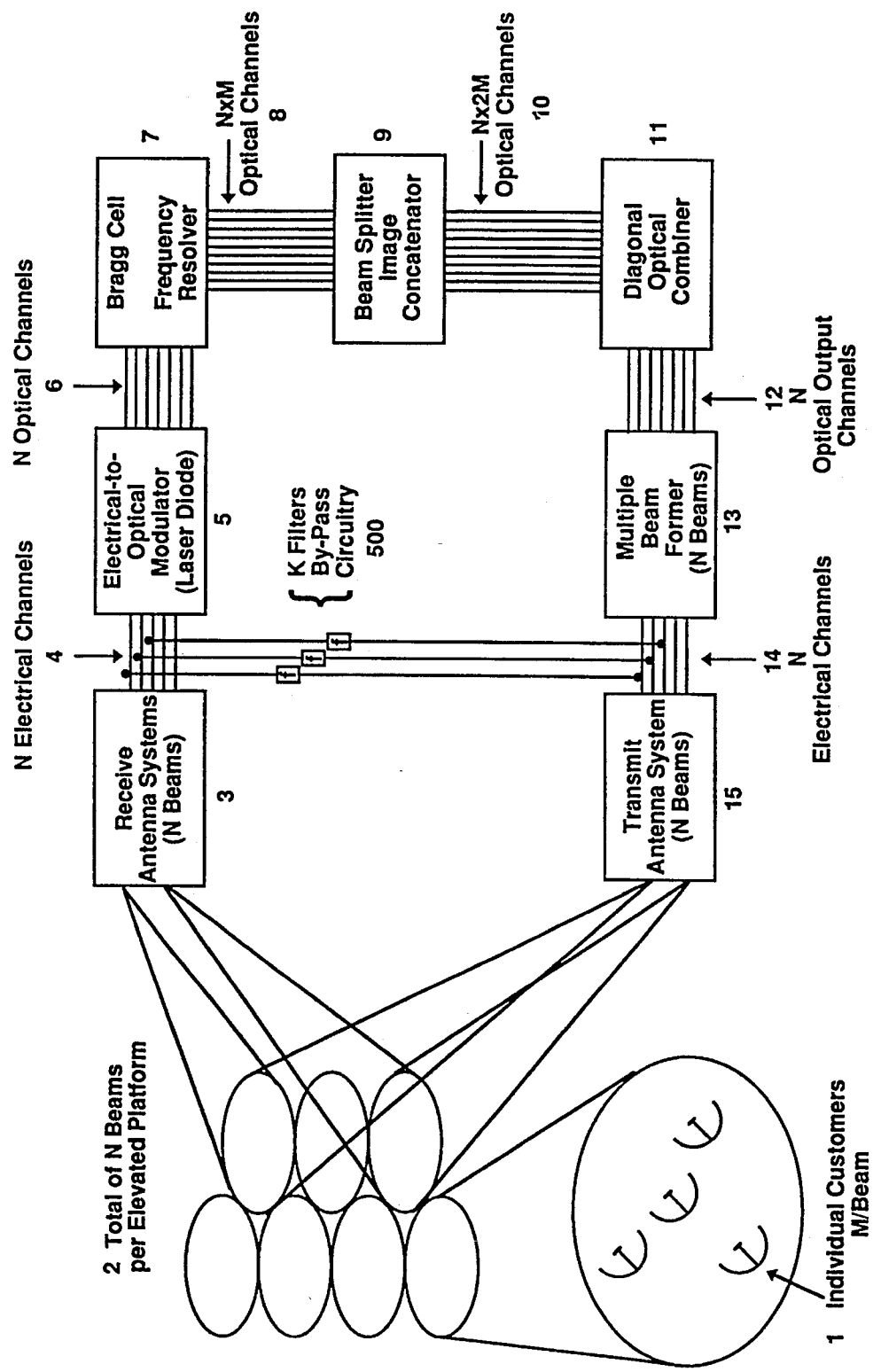
FIG. 6 describes an intra-beam communications path for "local" signaling that by-passes the switch processing.

FIG. 6 describes a slightly more complex implementation where the switch portion of the OCCS (i,e., elements 5, 6, 7, 8, 9, 10, 11, 12 and 13 in FIG. 6) is by-passed by a set of K frequency unique intra-beam signals, while M additional signals, which are resident on each of the N electrical channels 4 are ultimately passed to the optical switch portion of the OCCS. The intra-beam signals are extracted by K frequency selection filters 500 from the N electrical channels 4 and passed directly to the output N electrical channels 14, which are connected to the transmit antenna system 15. This feature permits the system to accommodate a large number of "local calls," without increasing demand on the switch system resources. In other words, this allows for non-switched communications within a beam or sector.

Disposed between the N electrical channels 4 (input) and N electrical channels 14 (output) are frequency selective by-pass circuitry 500. The by-pass circuitry 500 isolates each set of K frequency unique signals from the M additional signals on each of the N electrical channels 4, using conventional bandpass filter technology. All energy on the N electrical channels 4 is ultimately passed to the primary switch processing functions for inter-beam switching. Each of the N optical output channels 12 from the primary processing switch functions are connected to circuitry for converting the N optical output channels 12 into N electrical channels 14 (e.g., a set of diode detectors). The N electrical channels 14 are then combined with the K frequency unique signals output from the by-pass circuitry 500. The N output channels 14, which now contain the K intra-beam signals and the M "switched" inter-beam signals are then passed to transmit antenna system 15 for transmission.

FIGS. 7A and 7B show two ways to create multiple antenna beams from a single antenna, where each beam may be oriented to service a distinct geographic sector. FIG. 7A shows a standard multiple feed curved reflector design, commonly called a "Gregorian" fed multiple beam antenna. In that antenna, a series of actual RF feeds 21 are located at the focal plane of a curved reflector 22 so as to create a series of beams 23 that would cover a large area (e.g., continental U.S.). FIG. 7B shows an RF Lnneburg lens, a technique that utilizes a dielectric sphere 24 that has a variable dielectric constant as a function of radius, so as to focus any parallel rays to a point on the far side of the sphere. If M feeds were located on the appropriate locations 25, M beams 23 covering the desired area would be created.

The above two multiple antenna beam techniques are well known to ordinarily skilled artisans in this technological field, and so need not be detailed any further here.

FIG. 7C describes a third approach to providing multiple antenna beams, each of which services a distinct geographic sector. This third approach is particularly well suited for the second preferred embodiment of the invention, ground-based elevated platforms, such as a communications tower, including towers used for another purpose such as an active TV or radio broadcast tower. A ring of reflective antennas 27, between 3 and 500, preferably 20, are mounted on a tower 26 such as to cover sequential angular sectors 28. Each antenna is directional and has a main beam 29 that is oriented toward a distinct geographic sector. It would be clear to one of ordinary skill in the art that a plurality of more expensive multiple beam antennas may be used in place of any subset of the reflective antennas. The adjacent angular sectors 28 are isolated spatially, but can be further isolated from each other by employing alternate polarization 30 or by using separate and distinct frequency bands 31. Linear (vertical and horizontal), or preferably alternating circular polarization 30 may be used to isolate each beam from its nearest neighbor. For example, using an arbitrary numbering scheme, odd numbered antennas would employ RHC (right hand circular polarization), while even numbered antennas would use LHC (left hand circular polarization). Frequency separation between adjacent sectors may be used in combination with polarization isolation or an independent isolation technique. For instance, it would be preferable that sector 1 receive on band $f_1$ and transmit on $f_2$ while sector 2 could receive on band $f_2$, and transmit on $f_1$ 31.

An alternative frequency separation approach would be for sector 1 to receive and transmit in band $f_1$ and the nearest neighbor sectors would receive and transmit in $f_2$, where $f_1$ and $f_2$ are non overlapping. This, of course, is an inefficient use of bandwidth.

A further alterative to promote isolation between beams or sectors would be to assign codes to individual users. Adjacent beam/sector interference will then be suppressed in the receiver detection circuitry, as is the case with various systems using signals with large time-bandwidth products. The likelihood of exhausting the number of available codes is a limitation with this approach.

Figure 8:
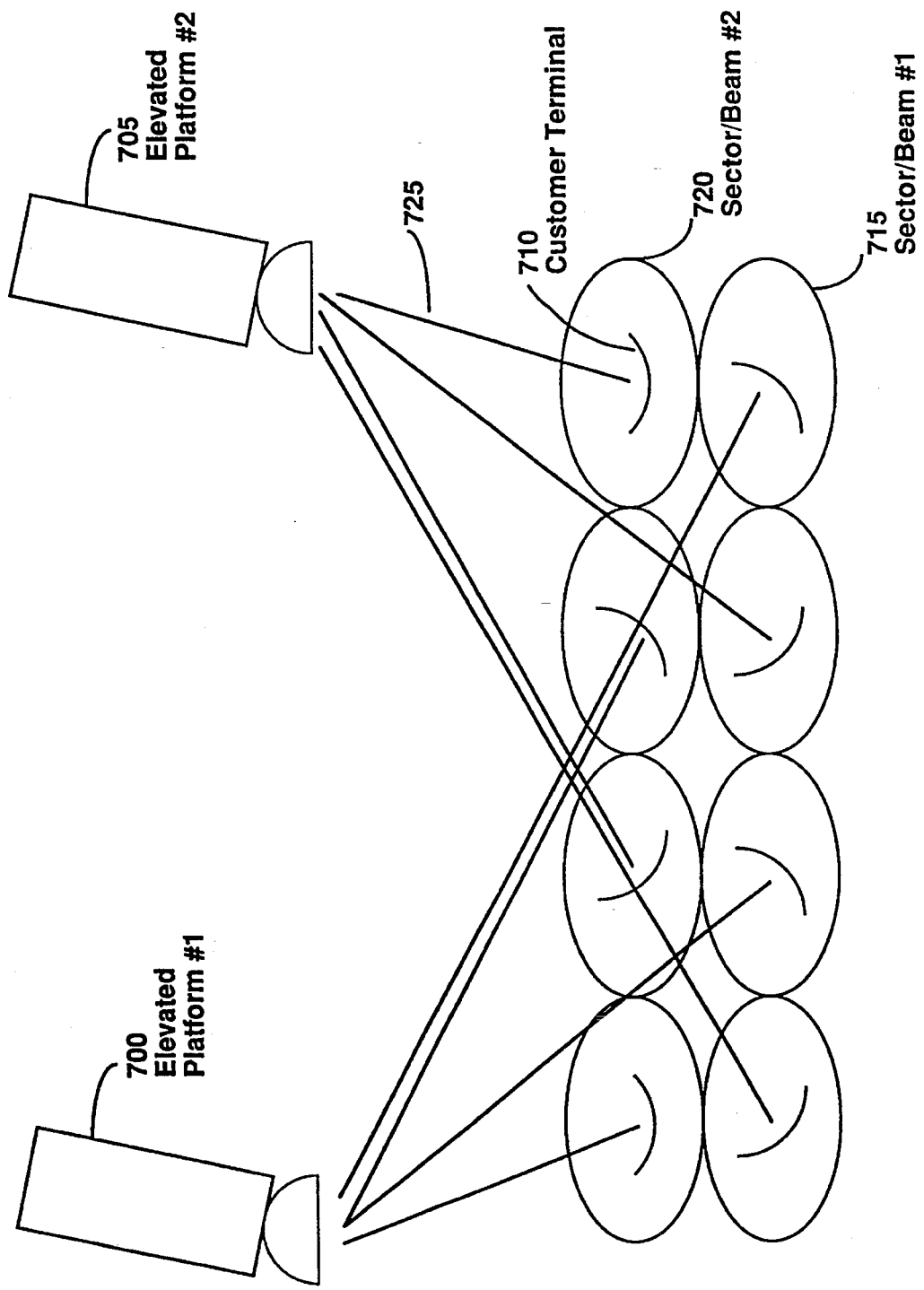
FIG. 8 describes a multiple elevated platform system that achieves enhanced sector isolation by the user terminal employing a set of directional antennas.

A further alternative for improving the isolation between sectors is described in reference to FIG. 8. This approach for improving isolation requires the use of multiple elevated platforms and directional customer terminal antennas. Elevated platform 700 transmits and receives within a plurality of sectors/beams, one of which is shown as Sector/Beam #1 715. A second elevated platform 705 transmits and receives within a plurality of sectors/beams covering the same general geographic area as the first elevated platform 700, one of which is shown as Sector/Beam #2 720. Sector/Beam #1 715, and Sector Beam #2 720 may cover the same frequency bands, yet do not interfere. The reason they do not interfere is because a customer terminal (e.g., 710) uses a directional antenna that captures only one of the elevated platforms 700 within its main lobe 725. Sector/Beam #1 715 and Sector/Beam #2 720 will be substantially overlapping provided they are appropriately spaced (e.g., about 4° for geostationary satellites, and about 5 miles for towers). This isolation approach can further be enhanced with the use of frequency separation and/or polarization isolation.

Figure 9:
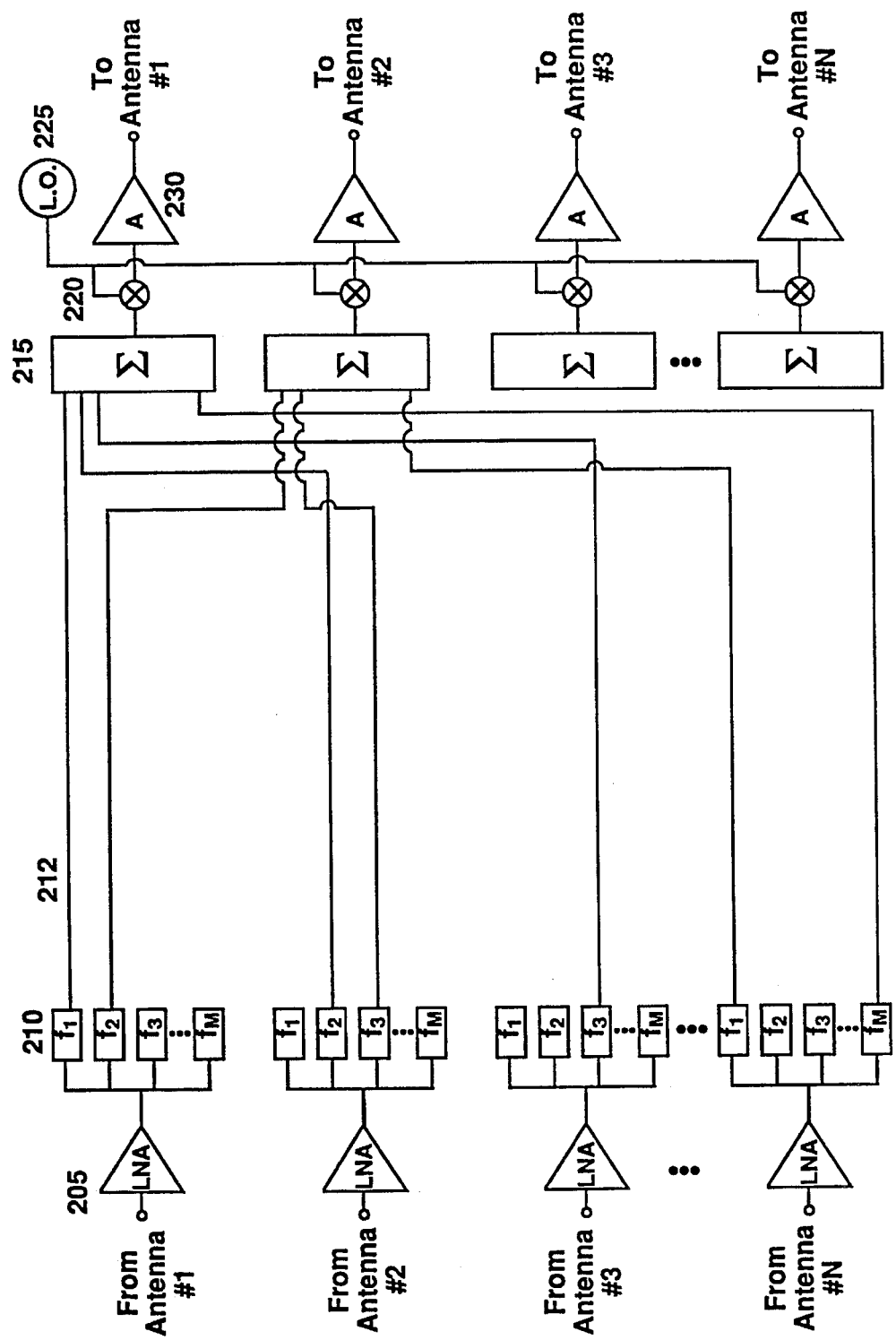
FIG. 9 is an overview of a third embodiment of an electrically switched system that may be used in any elevated platform, including a satellite or a tower.
Figure 10:
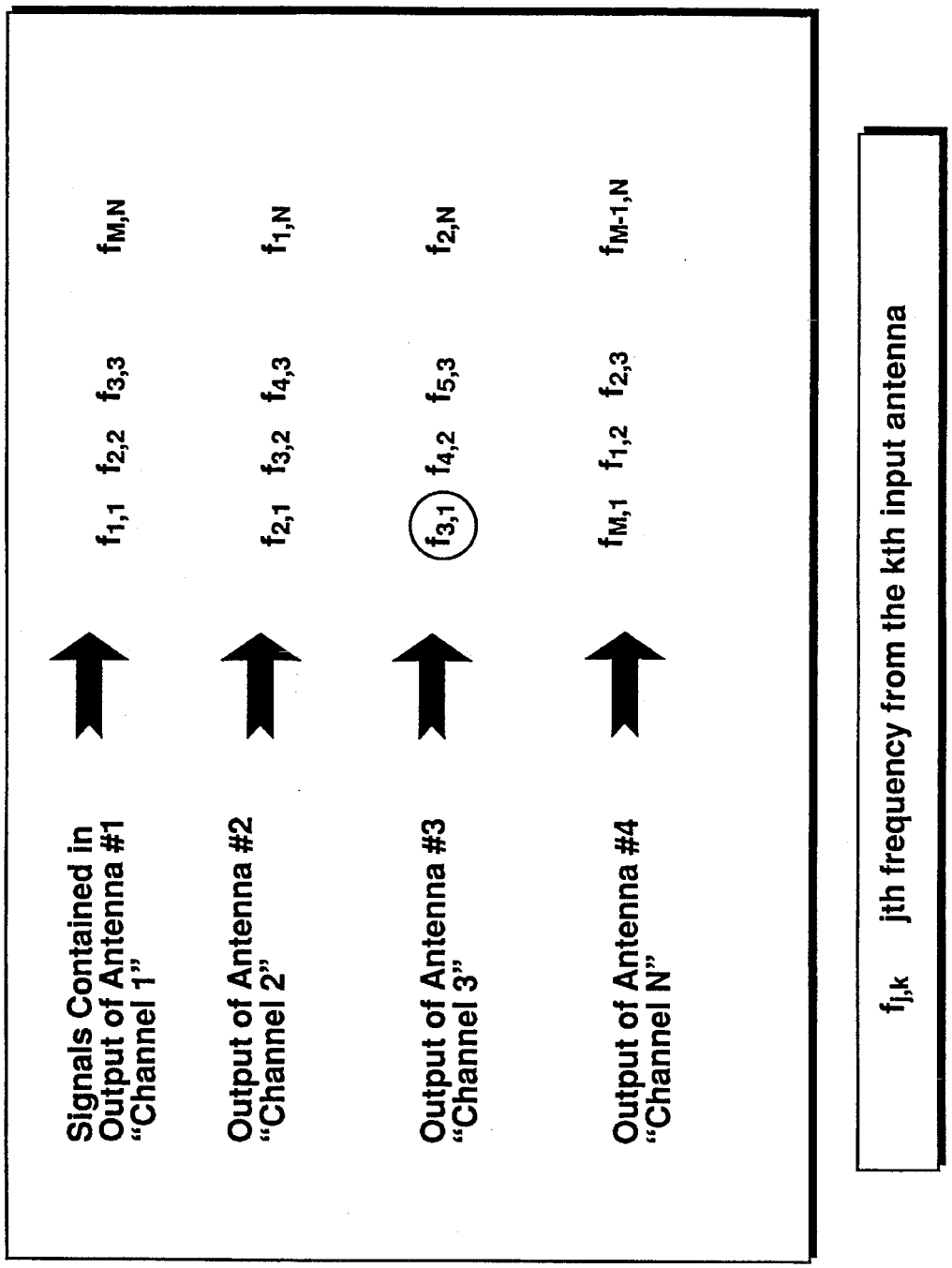
FIG. 10 describes the switch matrix that defines those frequencies received from a particular input antenna which are then electrically connected to a particular output antenna.

FIG. 9 and FIG. 10 illustrate another embodiment of the invention in which an electrical equivalent to the optically coupled communications switch is utilized. Electrical outputs from the antenna system (e.g., a set of N antennas), correspond to individual outputs from individual antennas, and corresponding beams. Signals contained within each beam are from the M user covered by the beam, each signal distinguished by frequency band $f_1$ through $f_M$. The electrical outputs are appropriately amplified by a low noise amplifier 205 (which is part of the antenna system) and then passed through a bank of M frequency selective (bandpass) filters 210. Other suitable channelizing techniques may be used such as a channelizing receiver. The bank of M frequency selective filters 210 electrically isolate the M signals, based on their frequency content. Each signal is then routed by electrically conductive wires 212 or other means used for transporting electrical communications signals (e.g., optical fibers, optical channels, RF repeaters, etc.) to one of a set of N summation devices 215, which are well known in the art. Each signal is routed according to the wiring matrix shown in FIG. 8, and will be explained by an example below. According to FIG. 8, each summation device 215 contains one frequency, $f_1$ to $f_M$, from each of the antenna's beams; any source terminal in any beam may pass its signal to any out-going beam as long as that user selects the appropriate up-link frequency. Moreover, since the output of each summation device is electrically connected to one of the antenna inputs, via components of the transmit antenna system including a mixing circuit 220 driven by a local oscillator (L.O.) 225 and an amplifier 230, the user may transmit a signal to any other user in any sector by originally selecting the appropriate transmit frequency. As an example, referring to FIG. 8, if a user in the sector covered by antenna 1 wished to communicate with a user located in the sector covered by antenna 3, the user would transmit a signal in frequency band corresponding to $f_{3,1}$, as indicated by the circled channel element in FIG. 8.

The "double hop" random switching capability can be added to this embodiment of the invention in the same manner that it was described for addition to the earlier described embodiments of the invention. Once again, the "double hop" capability requires the use of an additional remote terminal that can re-route signals through a different sector.

Similarly, intra-beam signaling may be achieved in the same way that was described for the optical communication switched system. In particular, K frequency selective filters may be added to the filter bank 210 for extracting all intra-beam signals. These "local signals" may then be transmitted directly by the transmit antenna dedicated to service that particular sector.

While the invention has been described in detail with reference to preferred embodiments, various changes and modifications within the scope and spirit of the invention will be apparent to those of working skill in this technological field. Thus, the invention is to be considered as limited only by the scope of the appended claims.

What is claimed is:

1. A two-way optical communications switch system useful for a single elevated platform, said optical communication switch system capable of switching a large number of wide bandwidth channels, comprising:

an elevated platform for hosting said optical communications switch system;

a receive antenna system for receiving a first set of N beams, each of said first set of N beams servicing M customers;

an electrical-to-optical modulator for forming a first set of N optical channels from respective ones of said N beams;

a frequency resolver for spreading each of said first set of N optical channels in one dimension for creating a first set of N×M optical channel elements;

a beam splitter image concatenator for duplicating said first set of N×M optical channel elements to create a substantially identical second set of N×M optical channel elements, said first set of N×M optical channel elements adjacent to said second set of N×M optical channel elements to form a dual virtual array having N×2M optical channel elements and M diagonals, each of said M diagonals comprising M optical channel elements;

a diagonal optical combiner for combining said M optical channel elements for each of said M diagonals into N optical outputs for forming a second set of N beams; and a transmit antenna system for transmitting said second set of N beams, each servicing M customers simultaneously.

2. The system of claim 1 wherein said frequency resolver includes a Bragg Cell.

3. The system of claim 2 further comprising a source terminal and a destination terminal, said source terminal routing signals through said optical communication switch system for establishing communication with said destination terminal, said source terminal and said destination terminal including control electronics to route signals through said optical communication switch system.

4. The system of claim 3 wherein the signals are wide bandwidth signals.

5. The system of claim 3 wherein said signals includes a plurality of signals within each subband useful for servicing additional customers.

6. The system of claim 2 wherein said frequency resolver further comprises:

a collimating lens disposed between said Bragg Cell and said beam splitter image concatenator, said collimating lens for collimating said N×M optical channel elements.

7. The system of claim 2 wherein said beam splitter image concatenator includes, a beam splitter for splitting each of said first set of N×M optical channel elements to form said second set of N×M optical channel elements, and a regular mirror disposed between said beam splitter and said dual virtual array, said regular mirror for reflecting said second set of N×M optical channel elements to create a first N×M virtual array adjacent to a second N×M virtual array, said first N×M virtual array and said second N×M virtual array comprising said dual virtual array.

8. The system of claim 2 wherein said diagonal optical combiner includes a cylindrical focusing lens disposed between said dual virtual array and said transmit antenna system, said cylindrical focusing lens for combining said M optical channel elements of said M diagonals to form N optical output channels, said diagonal optical combiner further including a multiple beam former for converting said N optical output channels into said second set of N beams.

9. The system of claim 2 wherein said elevated platform is a satellite.

10. The system of claim 2 wherein said elevated platform is a ground-based tower.

11. The system of claim 2 further including a source terminal, a destination terminal, and an intermediate terminal, said source terminal re-coding a signal for routing via said intermediate terminal to said destination terminal in the event a particular channel that is selected in accordance with a predetermined encoding scheme is occupied.

12. The system of claim 11 wherein said source terminal includes detection circuitry for detecting an occupied channel and re-coding said signals with a predetermined code when said occupied channel is detected, and said intermediate terminal including detection means for detecting said predetermined code and re-routing said signals encoded with said predetermined code.

13. The system of claim 11 wherein said intermediate terminal is an elevated platform.

14. The system of claim 1 wherein said wide bandwidth channels are one-way distributed video services selectable by said M customers.

15. The system of claim 1 wherein said receive antenna system and said transmit antenna system include a set of directional antennas, said antennas employing alternating polarization to enhance isolation.

16. The system of claim 1 wherein said N beams are further isolated by employing frequency separation between adjacent of said N beams.

17. The system of claim 1 wherein said beams are further isolated by employing at least a second elevated platform, said elevated platform and said second elevated platform covering over lapping sectors, a source terminal and a destination terminal, the terminals each employing a directional antenna that spatially isolates one of said elevated platform or said second elevated platform.

18. The system of claim 1 further comprising:
by-pass circuitry for extracting a set of selected ones of intra-beam signals from said first set of N beams, said intra-beam signals routed directly to said second set of N beams for transmission by said transmit antenna system.

19. The system of claim 1 wherein alternating ones of said N beams alternate a transmit frequency and a receive frequency for enhancing beam isolation.

20. A two-way communications switch system useful for a single elevated platform, said communication switch system capable of switching a large number of wide bandwidth channels, comprising:
a receive antenna system for receiving a first set of N beams, each of said first set of N beams servicing M customers;
an elevated platform for hosting said communication switch system;
a bank of frequency selective filters for forming a first set of N channels from respective ones of said N beams, each of said first set of N channels having M signals, each of said M signals separated by frequency;
a set of summation devices for forming a second set of N channels, each of the channels comprising M signals, each of said M signals from a separate one of said first set of N channels;
routing means for routing said M signals from each of said first set of N channels to said summation means; and
a transmit antenna system for converting said N channels into said second set of N beams and transmitting said second set of N beams servicing M customers simultaneously.

21. The system of claim 20 further comprising a source terminal and a destination terminal, said source terminal routing signals through said communication switch system for establishing communication with said destination terminal, said source terminal and said destination terminal including control electronics to route signals through said communication switch system.

22. The system of claim 21 wherein the signals are wide bandwidth signals.

23. The system of claim 21 wherein said receive antenna system and transmit antenna system comprise a set of directional antennas, each of the antennas having beams oriented to service a distinct geographical sector.

24. The system of claim 21 wherein said signals includes a plurality of signals within each subband useful for servicing additional customers.

25. The system of claim 21 wherein said source terminal includes detection circuitry for detecting an occupied channel and re-coding said signals with a predetermined code when said occupied channel is detected, and said intermediate terminal including detection means for detecting said predetermined code and re-routing said signals encoded with said predetermined code.

26. The system of claim 21 wherein said elevated platform is a satellite.

27. The system of claim 21 wherein said elevated platform is a ground-based tower.

28. The system of claim 21 wherein said beams are further isolated by employing at least a second elevated platform, said elevated platform and said second elevated platform having over lapping sectors, a source terminal and a destination terminal, the terminals each employing a directional antenna that spatially isolated one of said elevated platform or said elevated platform.

29. The system of claim 20 wherein said beams are further isolated by alternating polarized energy employed in alternating ones of said beams.

30. The system of claim 20 wherein said beams are further isolated by employing frequency separation between adjacent ones of said beams.

31. The system of claim 20 wherein said wide bandwidth channels are one-way distributed video services selectable by said M customers.

32. The system of claim 20 further including a source terminal, a destination terminal, and an intermediate terminal, said source terminal re-coding a signal for routing via said intermediate terminal to said destination terminal in the event a particular channel that is selected in accordance with a predetermined encoding scheme is occupied.

33. The system of claim 32 wherein said intermediate terminal is an elevated platform.

34. The system of claim 20 further comprising:
by-pass circuitry for extracting a set of selected ones of intra-beam signals from said first set of N beams, said intra-beam signals routed directly to said second set of N beams for transmission by said transmit antenna system.

35. A two-way optical communications switch system useful for a single elevated platform, said optical communication switch system capable of switching a large number of wide bandwidth channels, comprising:
an elevated platform for hosting said optical communications switch system;
means for receiving a first set of N beams, each of said first set of N beams servicing M customers;
optical channel forming means for forming a first set of N optical channels from respective ones of said N beams;
spreading means for spreading each of said first set of N optical channels in one dimension for creating a first set of N×M optical channel elements;
N×M optical channel element duplicating means for duplicating said first set of N×M optical channel elements to create a substantially identical second set of N×M optical channel elements, said first set of N×M optical channel elements and said second set of N×M optical channel elements positioned to form a dual virtual array having N×2M optical channel elements and M diagonals, each of said M diagonals comprising M optical channel elements;
selective focusing means for combining said M optical channel elements for each of said M diagonals into a second set of N beams; and
transmitting means for transmitting said second set of N beams, each servicing M customers simultaneously.

36. The system of claim 35 wherein said spreading means includes a Bragg Cell.

37. The system of claim 36 further comprising a source terminal and a destination terminal, said source terminal routing signals through said optical communication switch system for establishing communication with said destination terminal, and said source terminal and said destination terminal including control electronics to route signals through said optical communication switch system.

38. A method for simultaneously switching wideband signals of a first set of M users in each of a first set of N beams to any of a second set of M users each in of a second set of N beams, comprising the steps of:

receiving a first set of N beams, each of said N beams servicing M customers;

converting each of said N beams from electromagnetic energy into N electrical channels;

converting said N electrical channels to a first set of N optical channels;

focusing said N optical channels;

collimating said first set of N optical channels;

focusing said N optical channels on a Bragg Cell;

converting said N optical channels into N×M optical channels;

collimating said N×M optical channels;

duplicating said N×M optical channels for forming a dual virtual array having N×2M optical channel elements and M diagonals, each of said M diagonals having M optical channel elements;

combining said M optical channel elements of each of said M diagonals;

forming a second set of N beams from the combined M optical channel elements of said M diagonals; and transmitting said second set of N beams to service a second set of M customers in each of said N beams.

* * * * *